United States Patent

Wang

[11] Patent Number: 5,937,633
[45] Date of Patent: Aug. 17, 1999

[54] HIGH-PRESSURE INTERCOOLED GAS TURBINE

[76] Inventor: Lin-Shu Wang, 21 Hawks Nest Rd., Stony Brook, N.Y. 11790

[21] Appl. No.: 08/867,302

[22] Filed: Jun. 2, 1997

Related U.S. Application Data

[60] Provisional application No. 60/018,981, May 31, 1996.

[51] Int. Cl.⁶ .................................................. F02C 7/143
[52] U.S. Cl. ......................... 60/39.161; 60/728; 415/179
[58] Field of Search .............................. 60/39.161, 39.53, 60/728; 415/179

[56] References Cited

U.S. PATENT DOCUMENTS

| | | | |
|---|---|---|---|
| 2,280,765 | 4/1942 | Anxionnaz | 60/728 |
| 4,244,191 | 1/1981 | Hendriks | 60/728 |
| 5,081,832 | 1/1992 | Mowill | 60/39.161 |
| 5,347,806 | 9/1994 | Nakhamkin | 60/728 |

Primary Examiner—Louis J. Casaregola
Attorney, Agent, or Firm—Daniel L. Gobetz

[57] ABSTRACT

The present invention includes an intercooled cycle gas turbine. The intercooled cycle gas turbine is supercharged to improve performance. Pereformance is defined in terms of thermal efficiency and mass specific power, the turbine defining a cycle with a peak cycle pressure and a peak cycle temperature. The turbine includes an intercooler for intercooling the turbine, wherein placement of the intercooler within the cycle divides the cycle into a first compression stage and a second compression stage. The intercooler placement $r=1/2 \ln P_{super}/\ln(P_{peak}/P_{super})$. The first compression stage and the second compression stage have an unequal pressure ratio.

11 Claims, 9 Drawing Sheets

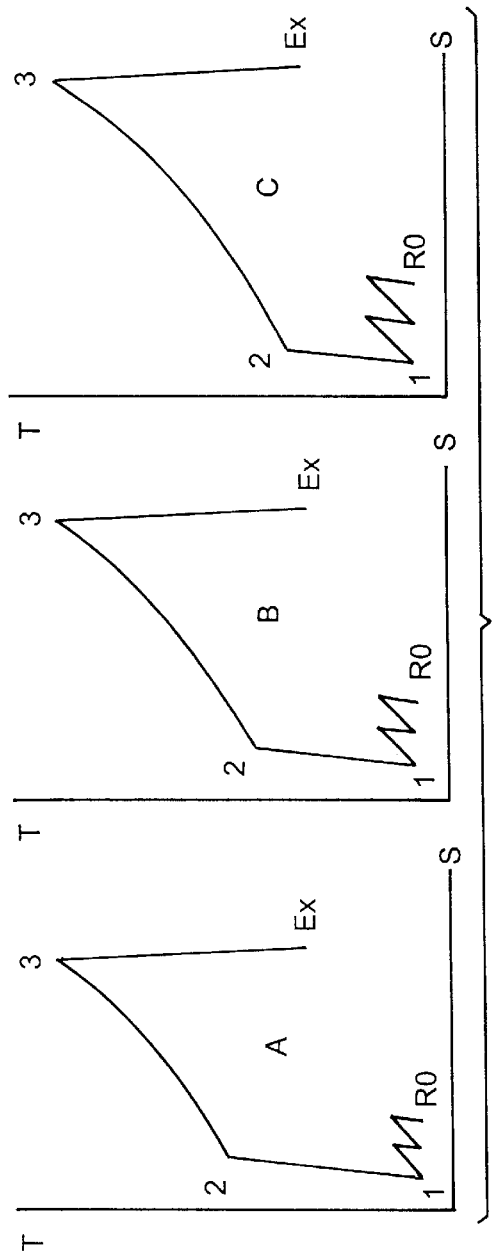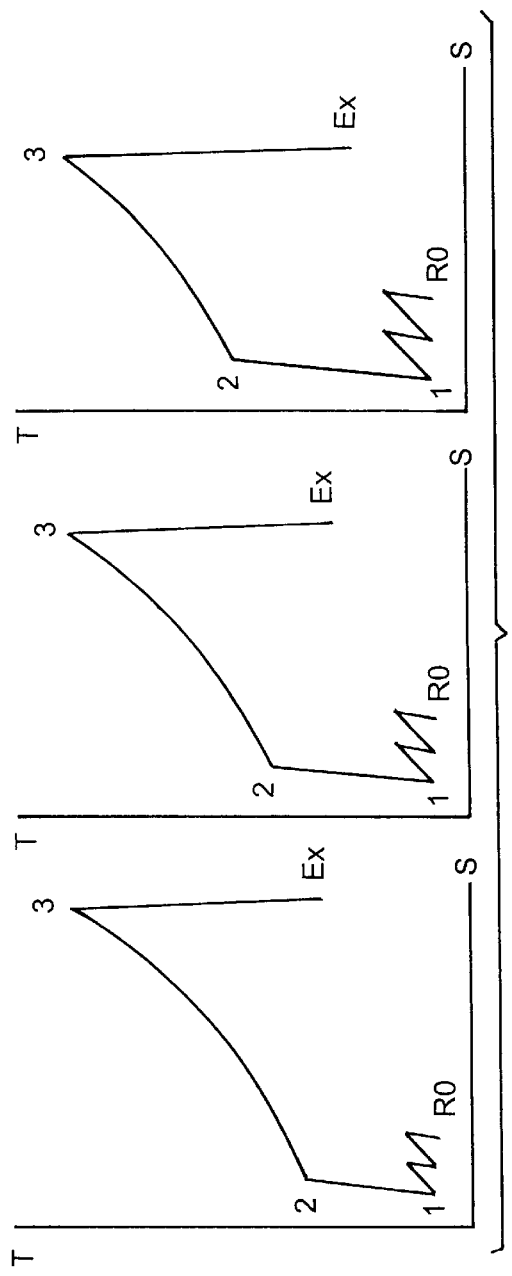
FIG. 3
FIG. 4

SIMPLE-CYCLE GAS TURBINE

REGENERATIVE-CYCLE GAS TURBINE

INTERCOOLED-SUPERCHARGED CYCLE

HIGH-PRESSURE INTERCOOLED GAS TURBINE

This application is a continuation of Provisional Patent Application Ser. No. 60/018,981 filed May 31, 1996.

BACKGROUND OF THE INVENTION

1. Field of the Invention

The present invention relates generally to intercooled cycle gas turbines. More particularly, the present invention relates to a high-pressure intercooled-supercharged cycle gas turbine with improved performance.

2. Description of the Prior Art

The capturing and reuse of exhaust gasses from gas powered engines are well documented today more than 150 years since the inception of the idea. Cogeneration and combined cycle systems, combustion turbine topping cycle and steam bottoming cycle, are the dominate systems of electricity capacity additions used today.

Other cycles based on the principle of exhaust energy recovery include the regenerative-cycle gas turbine, and the Steam Injection Gas turbine (STIG, also known as the Cheng cycle). Intercooling is sometimes used in conjunction with regeneration, intercooling regeneration being a refinement of a regenerative cycle. However, unlike the high-pressure simple-cycle gas turbine, all the gas turbine systems based on the principle of exhaust energy recovery are bulky, with engine specific power or compactness being compromised for the sake of fuel economy.

The design of Brayton-cycle (simple-cycle) gas turbines has experienced many modifications over seeking to improve the thermal efficiency and mass specific power (hereinafter collectively referred as the "performance") by concentrating on the need for compression before combustion. As exhibited hereinbelow in FIG. 1, improved performance of the turbine has been directly linked to increases in the peak cycle temperature and the corresponding increasing in the peak cycle pressure.

The great advantage of a high pressure simple cycle is that increases in peak cycle pressure toward optimum values correspond to increases in thermal efficiency, mass specific power, and working-fluid density. The simultaneous increase in thermal efficiency, mass-specific power and working-fluid density results in high performance from a compact package. However, even at the optimum high-pressure, significant enthalpy loss remains in the exhaust of a simple-cycle gas turbine.

Intercooling or intercooled compression can replace the adiabatic compression of the simple cycle. The intercooled cycle, intercooling alone without regeneration in order to maximize the power output the conventional intercooled cycle places intercooling means between compression stages of equal pressure ratio, can be considered to be a refinement of the simple cycle which produces greater power output. This conventional intercooling by itself has minimal effect on the efficiency of the turbine because additional fuel is added in the combustion chamber to produce greater net power through reduction in compression power. In fact, the thermal efficiency is often slightly lower than the simple-cycle's efficiency.

The possibility of different intercooler placement for maximum thermal efficiency under the constraint of constant peak-cycle pressure (the optimum peak-cycle pressure for a simple-cycle, for example.) and the possibility of a higher peak-cycle pressure (than the conventional optimum peak-cycle pressure for a simple cycle) for improved performance of such an intercooled-cycle have not been suggested by the prior art. It is, therefore, an object of the present invention to provide a intercooled-cycle gas turbine having intercooler placement for maximum thermal efficiency.

It is a further object of the present invention to provide a high-pressure intercooled-cycle gas turbine wherein increases in peak cycle pressure toward optimum values corresponds to increases in thermal efficiency, mass specific power, and working-fluid density.

Another object of the present invention is to provide a high-pressure intercooled-cycle gas turbine which is efficient and compact, ideally-suited for compact industrial application such as barge-mounted power plants, and marine applications Numerous innovations for high-pressure simple-cycle gas turbines have been provided in the prior art. Eventhough these innovations may be suitable for the specific individual purposes to which they address, they differ from the present invention as hereinafter contrasted.

SUMMARY OF THE INVENTION

The present invention includes a high-pressure intercooled cycle gas turbine. The addition of the pressure related variable, r, to the peak cycle pressure leads to the possibility of multi-variable optimization, which unfolds a higher performance zone than the simple cycle. The performance zone is defined by the optimal intercooler placement and peak cycle pressures that are considerably higher than the simple-cycle's optimum peak cycle pressures. A 20% to 30% gain in both thermal efficiency and mass specific power is realized. This gain is realized without bulky equipment, making the high pressure intercooled-cycle turbine ideally suited for compact, industrial application.

The invention, both as to its construction and its method of operation, together with additional objects and advantages thereof, will be best understood from the following description of the specific embodiments when read and understood in connection with the accompanying drawings.

BRIEF DESCRIPTION OF THE PREFERRED EMBODIMENTS

FIG. 3 is a graphical view of temperature versus entropy for various r values under constant $P_{peak}$ for a high pressure intercooled-cycle gas turbine constructed in accordance with a preferred embodiment of the present invention;

FIG. 4 is a graphical view of the effect of increasing $P_{peak}$ values on cycles with fixed placement of intercoolers with $r=r_{optimal}$ for the high pressure intercooled-cycle gas turbine;

DETAILED DESCRIPTION OF THE PREFERRED EMBODIMENT

Figure 1:
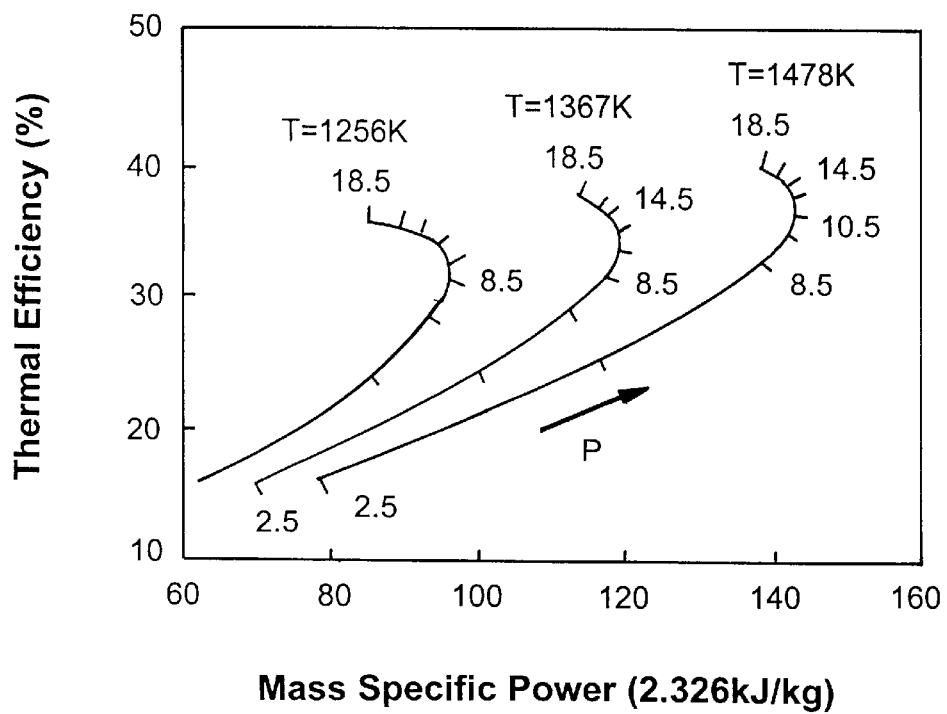
FIG. 1 is a graphic view of examples of performance curves of prior art Brayton-cycle gas turbines illustrating the relationship between thermal efficiency and mass specific power.
Figure 2:
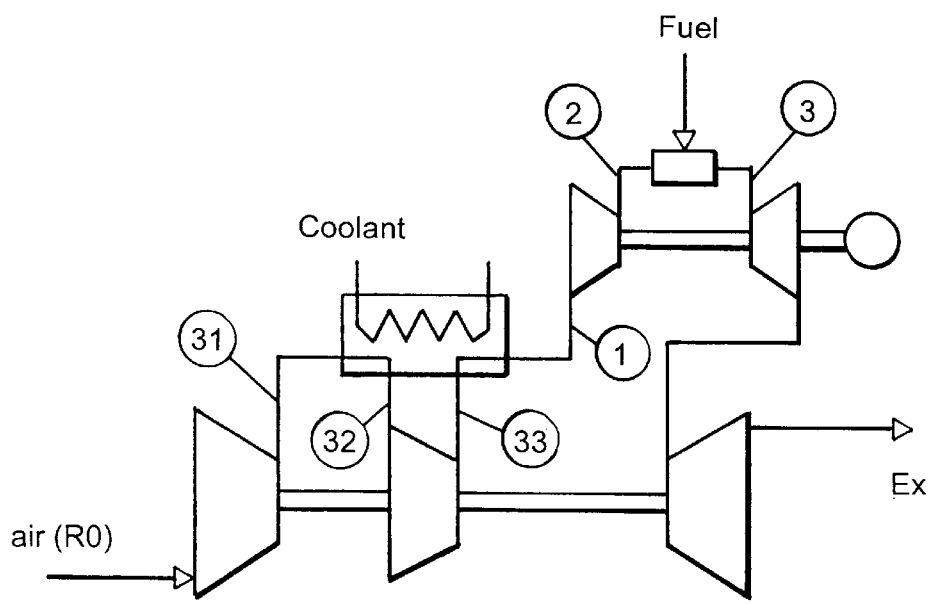
FIG. 2 is a schematic diagram of an intercooled-cycle gas turbine.

Firstly, referring to FIG. 1, the performance of a simple-cycle gas turbine is illustrated in terms of thermal efficiency and mass specific power $$\eta_{th} = \eta_{th}(P_{peak}; T_{peak}) \qquad (1)$$

$$p = p(P_{peak}; T_{peak}) \qquad (2)$$

as functions of peak cycle pressure and peak cycle temperature. Note that since the intercooler placement of the conventional intercooled-cycle gas turbine is fixed, its performance is also expressed as functions of peak-cycle pressure and peak cycle temperature.

In order to perceive the intercooled-cycle of the present invention as a logical development of the simple cycle and the conventional intercooled cycle, it is useful to enlist the peak cycle pressure as an explicit independent variable in its deliberation. Consider a simple cycle being modified into an intercooled cycle under the same peak cycle pressure with various possible divisions of compression stages (and the corresponding placement of intercoolers as seen in FIG. 3). Introduce intercooling-supercharging parameters, $\alpha$ and $r$:

$$P_{super}(\approx (P)^2) = P_{peak} \qquad (3)$$

$$r \equiv 1/2 \ln P_{super}/\ln(P_{peak}/P_{super}) \qquad (4)$$

or $$1/r \equiv 2\{[\ln P_{peak}/\ln P_{super}] - 1\}$$

Either $\alpha$ or $r$ can be used for characterizing the placement of the two intercoolers; they are simply related as $$\alpha^{-1} - 1 = (1/2)r^{-1}$$

With the introduction of $r$, performance of the intercooled cycle can now be represented as;

$$\eta_{th} = \eta_{th}(P_{peak}, r; T_{peak}) \qquad (5)$$

$$p = p(P_{peak}, r; T_{peak}) \qquad (6)$$

which bear direct relationship with equations (1) and (2). $r$ is defined between 0 and 1; $\alpha$ defined between 0 and 2/3. With $r=0$, equations (5), (6) reduce to equations (1), (2), the simple cycle case. With $r=1$, equations (5), (6) become the thermal efficiency function and the specific power function for the conventional intercooled-cycle gas turbine, where the two intercoolers are placed between compressors of equal pressure ratios.

Figure 5:
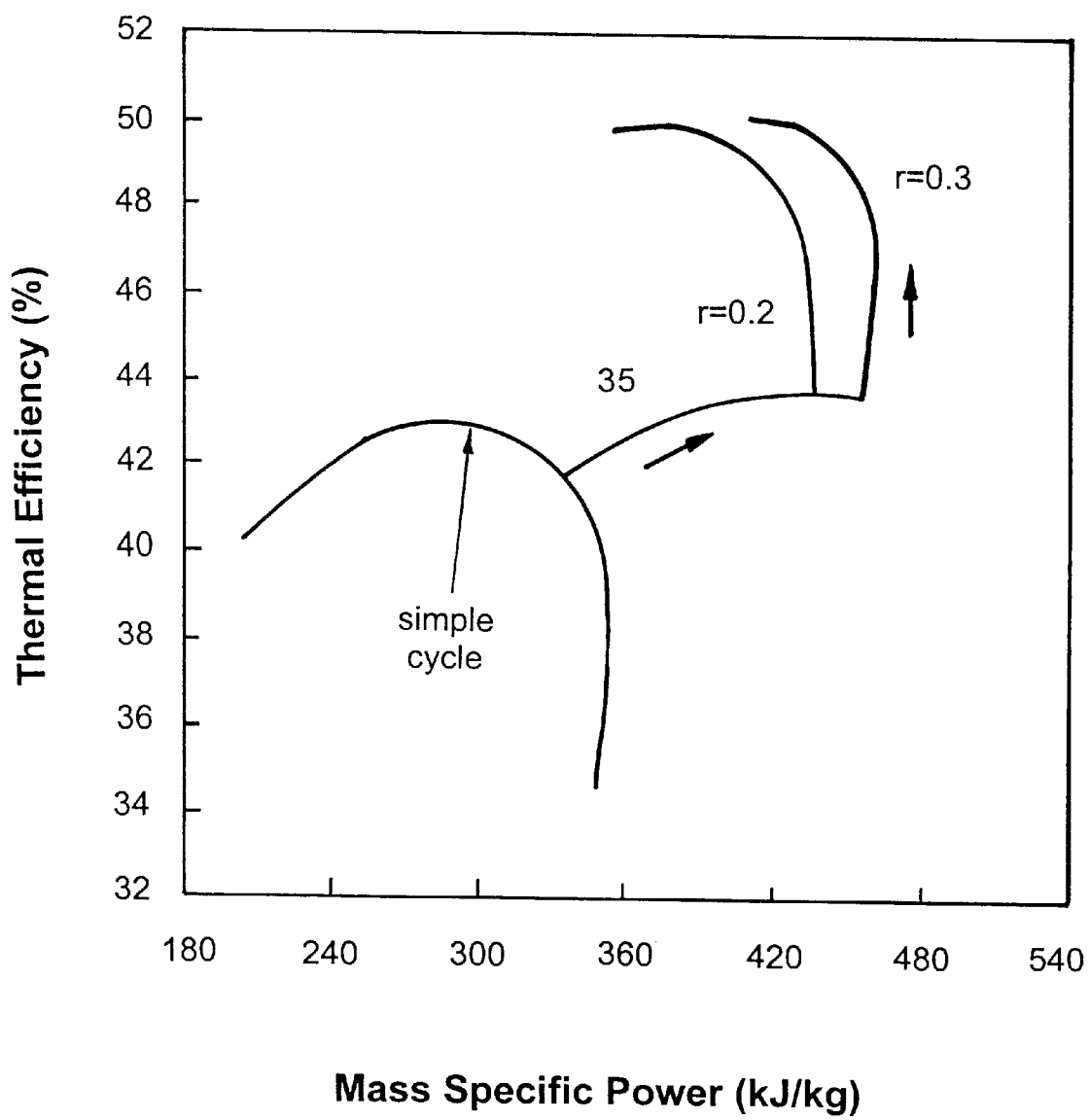
FIG. 5 is a graphical view of a two-variable univariate optimization procedure.

In an effort to perform a two-variable univariate-variate univariate search optimization, first consider performance as functions of $r$, with constant $P_{peak}$ (see FIG. 3 and FIG. 5). Different $r$ values represent different division of compression stages, i.e., different placement of intercoolers. As $r$ increases, both fuel consumption and power output increase. Specific fuel consumption increases as (see FIG. 3)

$$\delta h_{fuel} = (h_2)_A - (h_2)_B$$

Note that temperature of expanding gas, $3 \rightarrow E_x$, at each pressure level remains constant in FIG. 3, thus turbine expansion work remains constant. Change in net specific work output depends only on change in specific compression work, $\delta W_{comp}$, which equals to $$[(h_2 - h_1)_A - (h_2 - h_1)_B] - [(w_{super})_B - (w_{super})_A]$$

When $T_{2A}$ and $T_{2B}$ are high, $(h_2)_A - (h_2)_B$ is significantly greater than $(w_{super})_B - (w_{super})_A$. The ratio, $\delta w_{comp}/\delta h_{fuel}$, is greater than the cycle-A thermal efficiency, $$\delta w_{comp}/\delta h_{fuel} > (\eta)_A (= (w_{net})_A/(_ph)_R)_A).$$

It follows, $$(\eta_{th})_B = [(w_{net})_A + \delta w_{comp}]/[(_ph)_R)_A + \delta h_{fuel}] > (\eta_{th})_A$$

In this case, rasing $r_A$ to $r_B$ leads to cycle-B (in FIG. 4) of greater thermal efficiency and specific power.

When $T_{2B}$ and $T_{2C}$ become lower, $(h_2)_B - (h_2)_C$ is no longer significantly greater than $(w_{super})_C - (w_{super})_B$. The corresponding ratio will become smaller than the thermal efficiency of cycle-B leading to a smaller thermal efficiency for cycle-C in FIG. 3. This result is clearly shown in FIG. 6; toward the limit of $r=1$, its efficiency eventually declines to a value lower than the original simple-cycle's efficiency (see FIG. 6, P=25 case). Note that a rational design of an "intercooled" cycle should select a r value that is slightly greater than the optimal r, since higher specific power is achieved by this r selection with minimal reduction in thermal efficiency. This narrow range of r values will be referred to as "optimal" r's.

A follow-up to the question of intercooler placement is the question of optimum peak cycle pressure. As the intercooler placement should not be based only on specific power considerations, one should not base the choice of optimum peak cycle pressure only on the optimum peak cycle pressure know how of the simple cycle. The second step of the univariate optimization is carried out along one of the "optimal" r values. As shown in FIG. 5, the temperature of the exhaust will decrease with increasing $P_{peak}$, with corresponding increase in the thermal efficiency.

Figure 6:
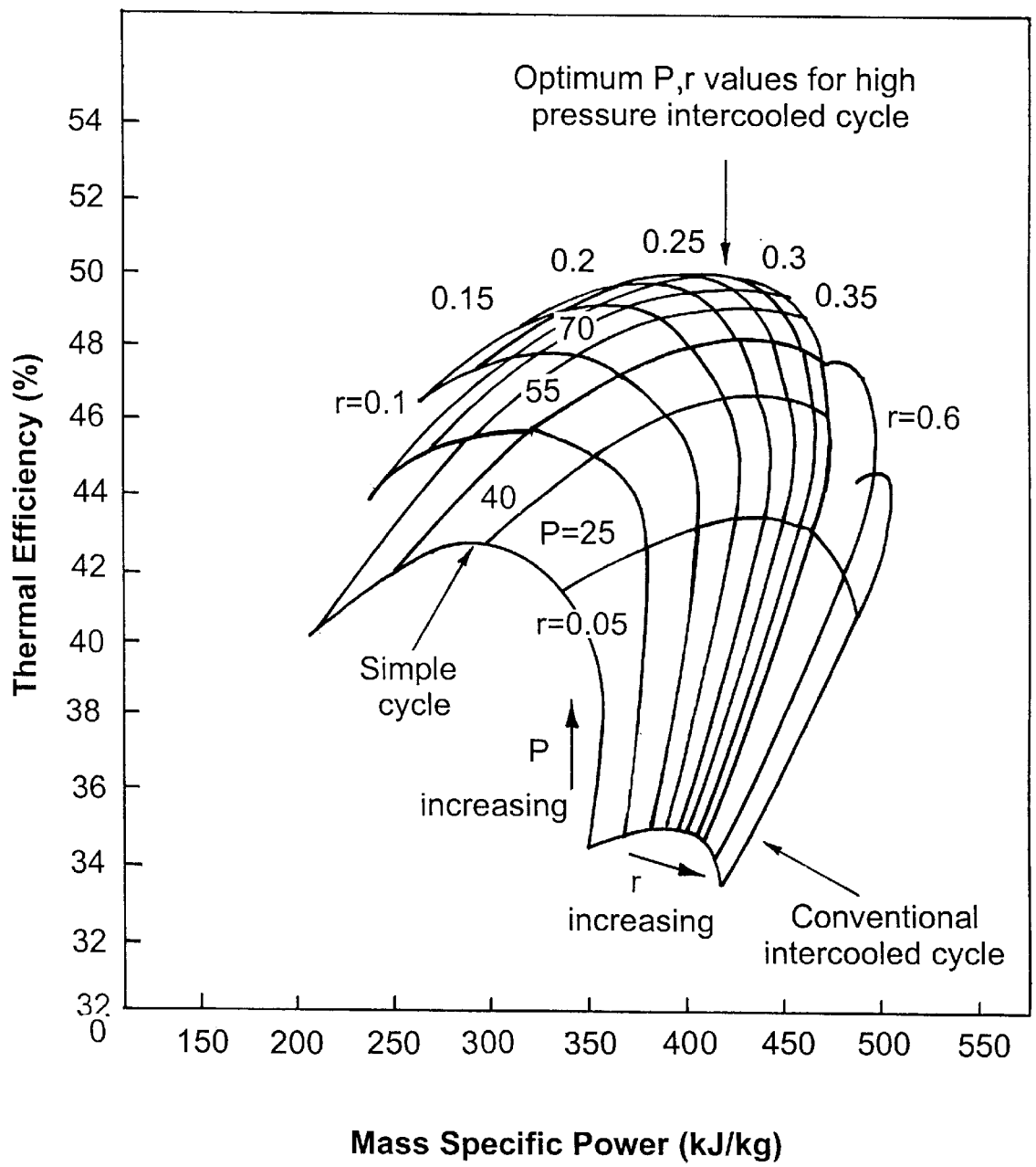
FIG. 6 is a graphical view of performance curves of the high pressure intercooled gas turbine illustrated in FIGS. 3 and 4.

A detailed explanation as shown in FIG. 5 and FIG. 6 is as follows: Initially, the expansion power increase approximately matches the increase of the required compression power (both supercharging compression and main compression). Therefore, increasing $P_{peak}$ leads to little change in the net power while bringing about reduction in fuel consumption (see FIG. 5), while a steep increase in thermal efficiency is effected. Gradually, however, increase in expansion power fails to match increasing power requirement of compression. This eventually stops the increase in thermal efficiency. At this point the peak cycle pressure for maximum efficiency is found for the particular r value. This optimum peak-cycle pressure is considerably higher than the optimum peak cycle measure of the simple cycle as a result of the delaying of catching-up of increase in required compression power to increase in expansion power with increasing $P_{peak}$ due to intercooling compression.

In referring to the following performance prediction description hereinbelow, reference is made to specifications of a gas turbine system shown in Table I. An example of the two-variable univariate optimization procedure outlined above has been carried out using GATE/CYCLE software (Enter Software, Inc., 1992 revision). As described in FIG. 6, performance curve for the simple cycle is first constructed. The assumptions adopted in the computation are close to those of GE LM6000. Based upon an assumption that the thermal efficiency of LM6000 at $P_{peak}=30P_0$ is 41%, while FIG. 6 shows a value close to 42% in substantial agreement with the real performance.

Consider a constant $P_{peak}$ of 25 and increasing r values of 0.05, 0.1, 0.15, 0.2. The thermal efficiency, $\eta$, is observed to increase along constant $P_{peak}$ curve, and reaches a maximum at r=0.2. Additional cases of r's are computed.

We now consider increasing $P_{peak}$ along constant r's of 0.2 and 0.3. Steep increase in the thermal efficiency is realized initially. This increase gradually slows and the thermal efficiency reaches a maximum about $P_{peak}$ of 100. Most of the gain in the thermal efficiency is already obtained, however, at a $P_{peak}$ around 70, which is twice as high as the highest peak cycle pressures of the current generation of the high pressure simple-cycle gas turbines.

Figure 7:
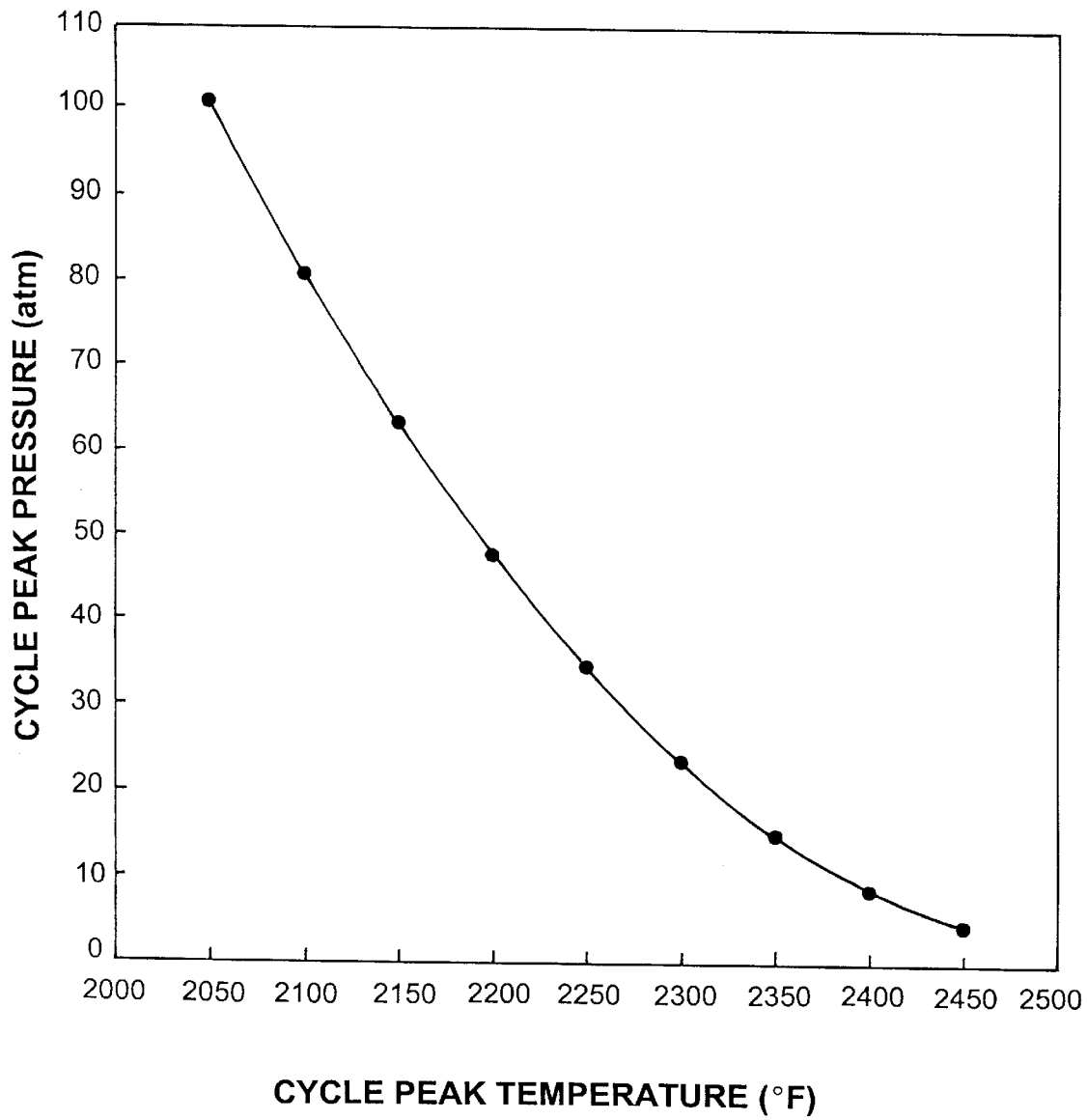
FIG. 7 is a graphical view of cycle peak temperature versus cycle peak pressure for a specific material used for a high pressure intercooled-cycle gas turbine constructed in accordance with a preferred embodiment of the present invention.

A complete set of performance curves is provided in FIG. 7, wherein significantly greater thermal efficiency and specific power, a 20% to 30% gain, over the simple cycle, and significantly greater thermal efficiency over the simple cycle and the conventional intercooled cycle, are shown at the optimal range of $P_{peak}$ about 70–100 P and r about 0.2–0.35.

Once the optimal values of $P_{peak}$ and r are selected for a design, $P_M$ and $P_S$ of the main compressor and the supercharging compressors are readily calculated according to Equation (4) and $P_{peak}=(P_S)_2 P_M$. The proposed gas turbine cycle may be logically referred to as the high-pressure intercooled cycle. However, since a $P_M$ value around 15–20 is expected, the additional intercooled compression is more likely on a nonconcentric shaft, which is properly considered as a "supercharging" shaft.

Performance maps such as FIG. 1, FIG. 5, and FIG. 6, are based on a constant temperature material-constraint. In these maps, the peak cycle pressure required for optimum performance are not explicitly considered to be dependent on material-characteristic that may limit the turbine performance. While it is possible to raise temperature limit (through more effective turbine blade cooling for example) or pressure limit (through more advanced mechanical design for example) by advanced design means, temperature and pressure are interdependent variables defining the material thermal/mechanical load limit when a material is used with common design features.

An innovation is introduced to construct performance maps based on material-constraint of temperature pressure functions:

$$f(T, P)=0,$$

Figure 8:
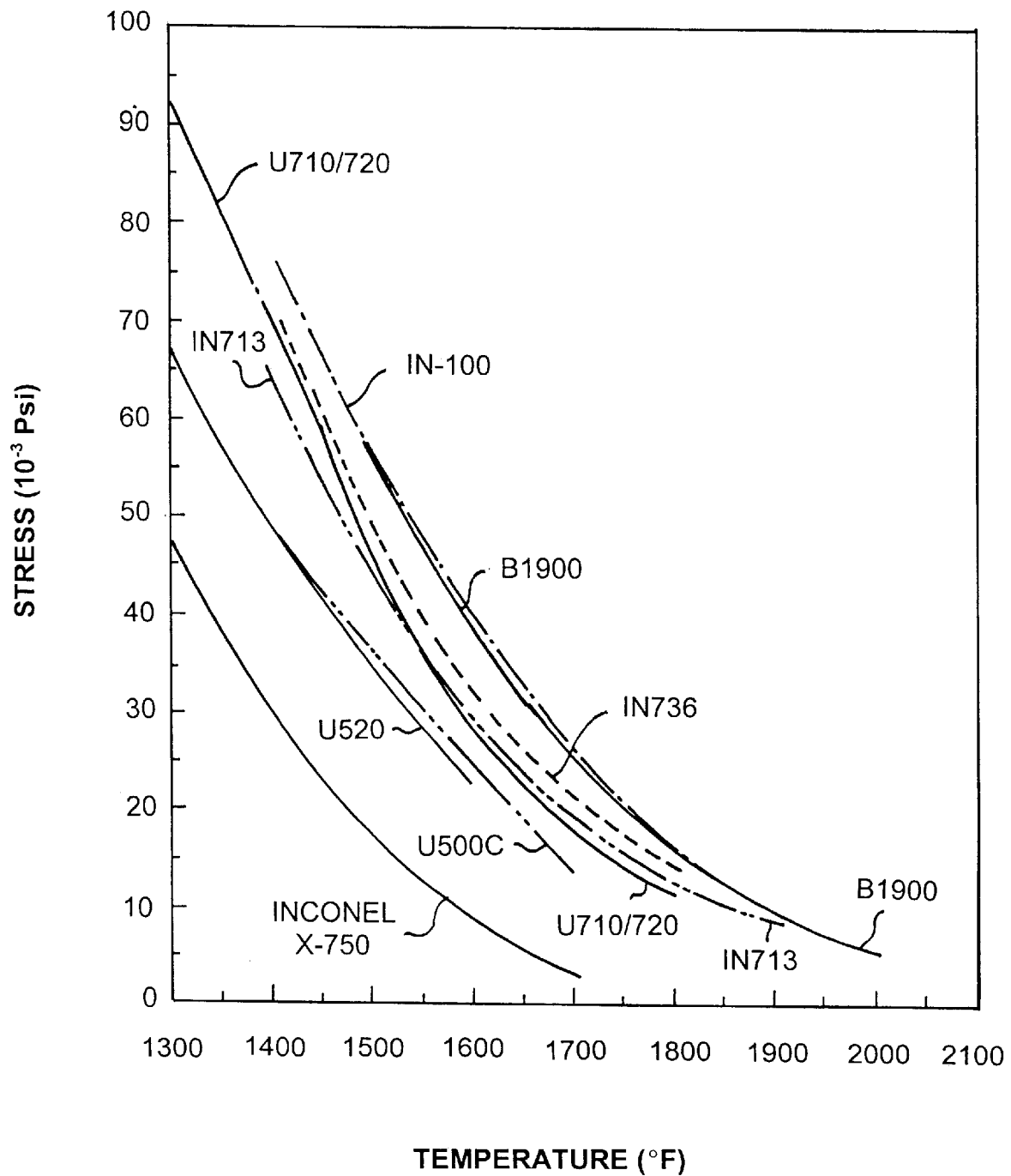
FIG. 8 is a graphical view of cycle peak temperature versus cycle peak pressure for a different materials used for a high pressure intercooled-cycle gas turbine constructed in accordance with a preferred embodiment of the present invention.

An example of which is shown in FIG. 7 and FIG. 8. Different materials are then represented by different functions: material A by fA(T, P)=0, material B by fb(T, P)=0, etc.

Figure 9A:
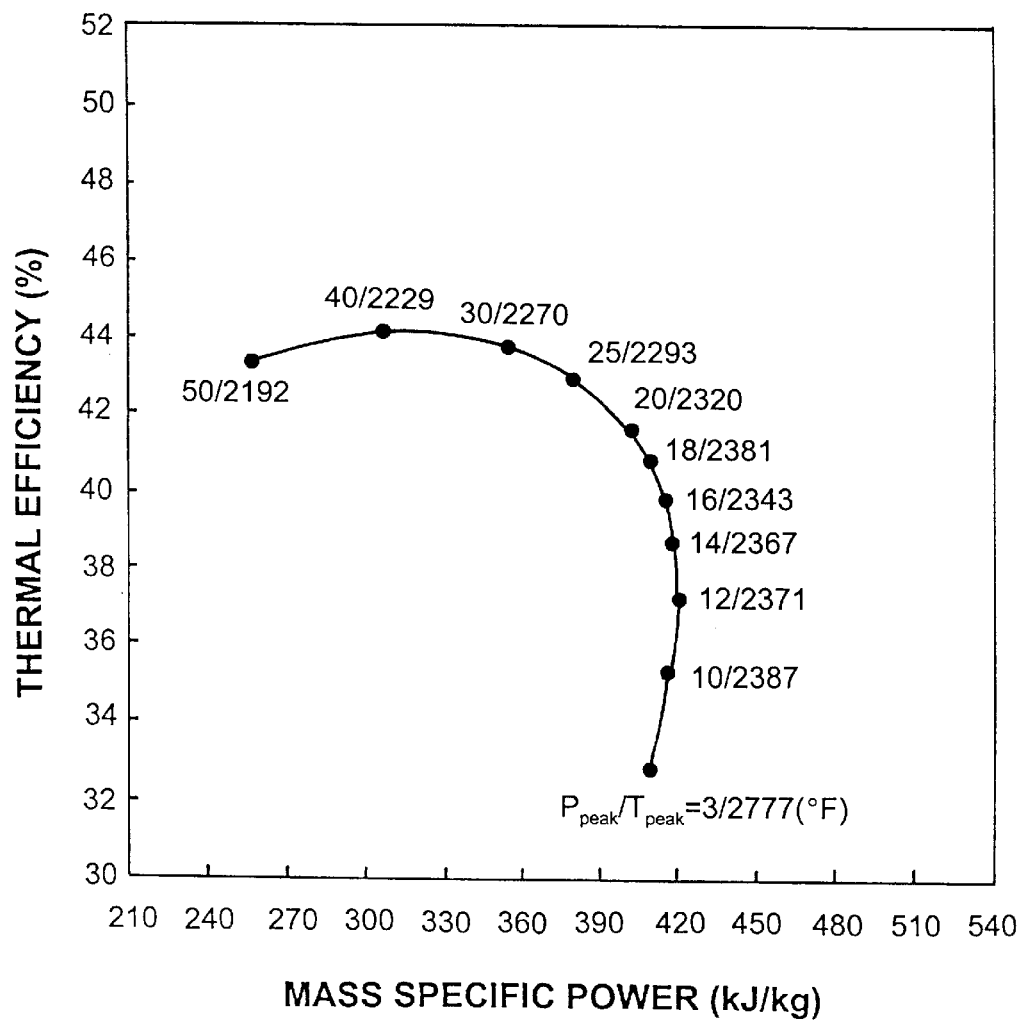
FIG. 9 is a graphical view of cycle peak performance of the materials illustrated in FIGS. 7–8.
Figure 9B:
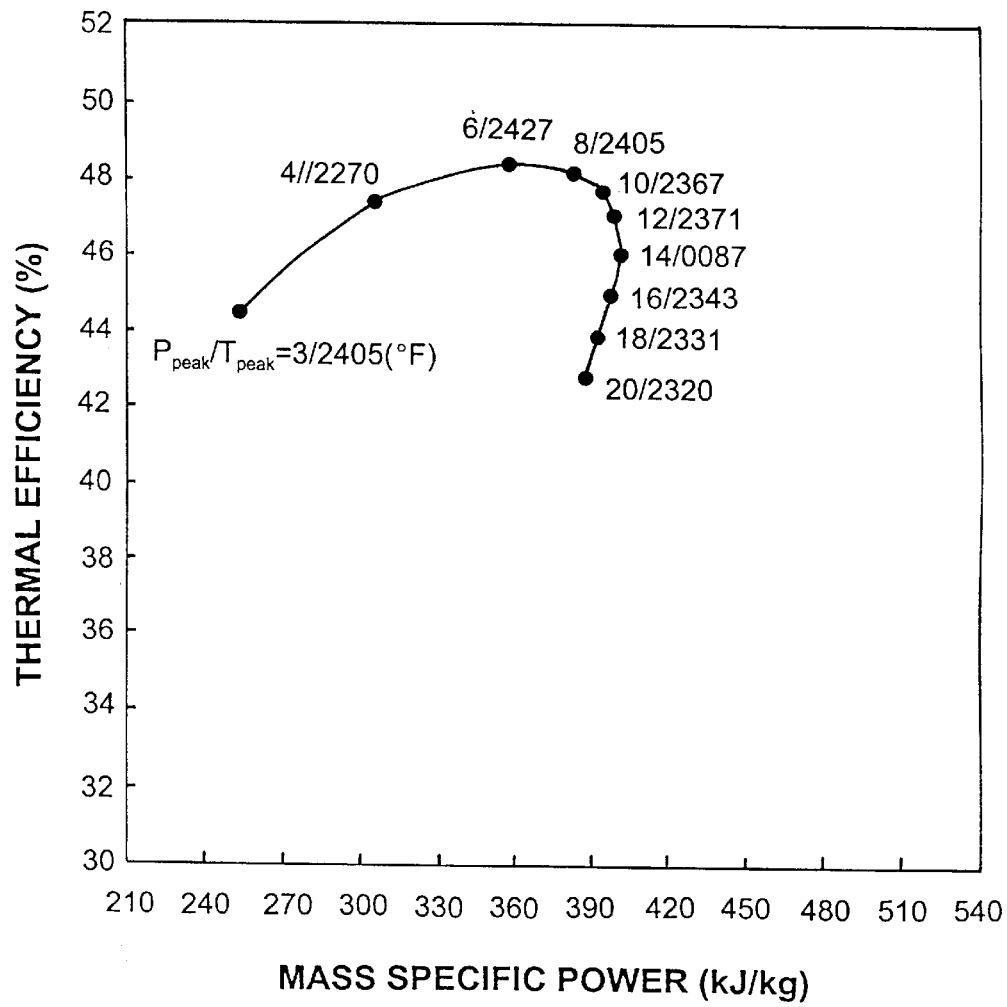
Figure 9C:
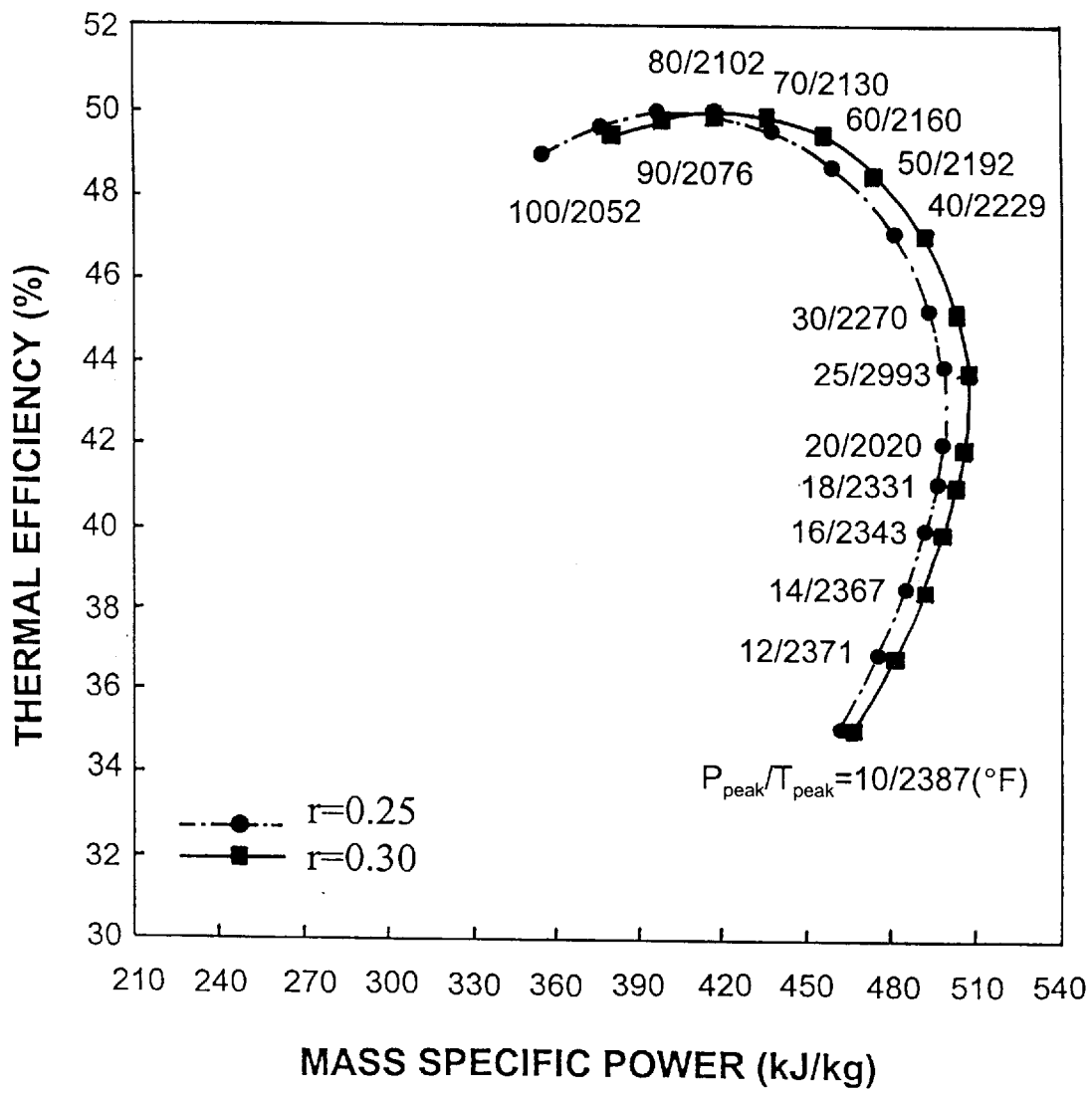

One can then consider the relative performances of turbine cycles—simple cycle, regenerative cycle, and high-pressure intercooled cycle—on the basis of the same material and the same common design features. Of the three turbine cycles, the optimum pressure (the peak cycle pressure for optimum performance) of the regenerative cycle is low, the optimum pressure of the simple cycle is moderate, currently around 30 to 1, and the optimum pressure of the high-pressure intercooled cycle is high. Their relative performances based on the material represented in FIG. 7 are shown in FIG. 9—with the high-pressure intercooled cycle at r=0.3. In this example, the pressure/temperature for the simple cycle is determined to be in the range of 14(atm)/2357 (° F.) to 30 (atm) 2270 (° F.). The condition of 30/2270 is close to the design of GE LM6000, an industrial turbine for maximum thermal efficiency. The pressure/temperature range for the regenerative cycle is determined to be 8/2405 to 12/2371. The pressure/temperature range for the high-pressure intercooled cycle at r=0.3 is determined to be 30/2270 to 70/2130. The superiority of the high-pressure intercooled cycle performance can be achieved at a higher peak cycle pressure and at a moderately lower peak cycle temperature (turbine inlet temperature).

Intercooling equipment is compact, of lower cost, and of lower maintenance in comparison with regeneration equipment. Two especially attractive intercooling means are intercooling for marine turbine, and evaporative cooling. An example of using intercooling for amrine turbine (a different turbine cycle) is the westinghouse/Rolls-Royce WR-21 ICR gas turbine. An example of using evaporative cooling is the Giannotti—SUNY, Stony Brook project to boost power and increase efficiency of LILCO's turbine for summer peaking power.

In conclusion, a high pressure intercooled-cycle gas turbine, which relates directly to both the simple cycle and the conventional intercooled cycle (as special limiting cases) is presented. The addition of the pressure related variable, r, to the peak cycle pressure leads to the possibility of multi-variable optimization, which unfolds a higher performance zone than the simple cycle. The performance zone is defined by the optimal intercooler placement and peak cycle pressures that are considerably higher than the simple-cycle's optimum peak cycle pressures. A 20% to 30% gain in both thermal efficiency and mass specific power is realized. This gain is realized without bulky equipment, making the high pressure intercooled-cycle tubine ideally-suited for compact, industrial application.

I claim:

1. A high-pressure intercooled cycle gas turbine with improved performance, performance defined in terms of thermal efficiency and mass specific power, the turbine defining a cycle with a peak cycle pressure and a peak cycle temperature; comprising:

a) a turbine; and b) intercooling means in fluid communication with the turbine for intercooling the turbine;

c) wherein placement of the intercooling means within the cycle divides the cycle into a first compression stage and a second compression stage, wherein the first compression stage and the second compression stage have an unequal pressure ratio;

d) wherein the the intercooler placement $r=1/2 \ln P_{super}/\ln(P_{peak}/P_{super})$.

2. The turbine as defined in claim 1, wherein 0.3<r<0.4.

3. The turbine as defined in claim 1, wherein the intercool water.

4. The turbine as defined in claim 1, wherein the intercooling means comprises evaporative cooling.

5. The turbine as defined in claim 1, wherein an optimum value of thermal efficiency of the turbine is attained when the peak cycle pressure is at an optimum value.

6. The turbine as defined in claim 1, wherein the first compression stage comprises at least two compressors, and wherein the second compression stage comprises at least one compressor.

7. The turbine as defined in claim 1, wherein the at least two compressors of the first compression stage have at least one shaft, and wherein the at least one compressor of the the second compression stage has at least one shaft.

8. The turbine as defined in claim 7, wherein the at least shaft of the at least two compressors is nonconcentric with the at least one shaft of the at least one compressor.

9. A high-pressure intercooled cycle gas turbine with improved performance, performance defined in terms of thermal efficiency and mass specific power, the turbine defining a cycle with a peak cycle pressure and a peak cycle temperature; comprising:

a) a turbine; and b) intercooling means in fluid communication with the turbine for intercooling the turbine;

c) wherein placement of the intercooling means within the cycle divides the cycle into a first compression stage and a second compression stage, wherein the first compression stage and the second compression stage have an unequal pressure ratio;

d) wherein the the intercooler placement $r = 1/2 \ln P_{super}/\ln(P_{peak}/P_{super})$, and $0.3 < r < 0.4$.

10. The turbine as defined in claim 9 wherein an optimum value of thermal efficiency of the turbine is attained when the peak cycle pressure is at an optimum value.

11. The turbine as defined in claim 10, wherein the intercooling means comprises evaporative cooling.

* * * * *